United States Patent [19]

Mellors

[11] Patent Number: 4,590,059

[45] Date of Patent: * May 20, 1986

[54] PROCESS FOR THE PRODUCTION OF MANGANESE DIOXIDE

[75] Inventor: Geoffrey W. Mellors, North Royalton, Ohio

[73] Assignee: Union Carbide Corporation, Danbury, Conn.

[*] Notice: The portion of the term of this patent subsequent to Oct. 9, 2001 has been disclaimed.

[21] Appl. No.: 749,265

[22] Filed: Jun. 27, 1985

Related U.S. Application Data

[63] Continuation of Ser. No. 698,745, Feb. 6, 1985, abandoned, which is a continuation of Ser. No. 537,564, Sep. 30, 1983, abandoned.

[51] Int. Cl.$^4$ ............................................. C01G 45/02
[52] U.S. Cl. ..................................... 423/605; 429/224
[58] Field of Search .......................... 423/605; 429/224

[56] References Cited

U.S. PATENT DOCUMENTS

| | | | |
|---|---|---|---|
| 1,078,788 | 11/1913 | Kaplan | 423/605 |
| 1,184,854 | 5/1916 | Holmes | 423/605 |
| 4,476,104 | 10/1984 | Mellors | 423/605 |

FOREIGN PATENT DOCUMENTS

| | | |
|---|---|---|
| 27076 | 9/1982 | European Pat. Off. . |
| 1157590 | 11/1963 | Fed. Rep. of Germany ...... 423/605 |
| 74972 | 5/1982 | Japan . |

OTHER PUBLICATIONS

Advanced Inorganic Chemistry, F. A. Cotton and G. Wilkinson (3rd Ed. 1972) p. 852.

*Primary Examiner*—Herbert T. Carter
*Attorney, Agent, or Firm*—C. F. O'Brien

[57] ABSTRACT

Manganese dioxide is produced from manganous salts by mixing a manganous salt with an alkali metal permanganate and/or ammonium permanganate followed by heating such mixture to about 150° C. under an oxygen-containing atmosphere until at least 85% of the manganous salt is converted to manganese dioxide and then further elevating the temperature to about 250° C. and maintaining this temperature until the surface area of the manganese dioxide is between about 3 square meters per gram and about 12 square meters per gram.

11 Claims, No Drawings

PROCESS FOR THE PRODUCTION OF MANGANESE DIOXIDE

This application is a continuation-in-part of prior U.S. application Ser. No. 698,745 filed Feb. 6, 1985, now abandoned, which application is a continuation of prior U.S. application Ser. No. 537,564 filed Sept. 30, 1983, now abandoned.

FIELD OF THE INVENTION

This invention relates to an improved process for the production of manganese dioxide from manganous (i.e. $Mn^{+2}$) salts. This process comprises intimately contacting at least one manganous salt with at least one compound selected from the group consisting of alkali metal permanganates and ammonium permanganate. The intimately contacted material is subjected to a two-step heating schedule to produce electrochemically active manganese dioxide suitable for galvanic cell applications.

BACKGROUND OF THE INVENTION

The use of manganese dioxide as an active cathode material (depolarizer) in nonaqueous cells is well known. Among the readily available manganese compounds which have been employed as a source of manganese dioxide are manganous salts such as manganous chloride, manganous sulfate, manganous carbonate and the like. Typically such manganous salts are thermally decomposed to produce manganese dioxide. For example *Advanced Inorganic Chemistry*, F. A. Cotton and G. Wilkinson, published by Interscience-John Wiley and Sons (3rd. Ed. 1972) states, at page 852, that manganese dioxide is normally made by heating manganous nitrate hexahydrate in air at a temperature of about 530° C. However, such procedure leads to the production of a highly crystalline beta form of manganese dioxide, or pyrolusite. This material has been used in aqueous batteries of the Leclanche type but in general does not produce as satisfactory results as do other forms of manganese dioxide.

European Patent No. 27,076 discloses a process for the pyrolysis of manganous nitrate tetrahydrate to form entirely beta type manganese dioxide. More specifically, this process involved heating the $Mn(NO_3)_2.4H_2O$ at 150° C., washing the product so obtained first with warm distilled water and subsequently with 1% ammonium hydroxide solution, and then drying the material at a temperature on the order of 400° C. to 450° C. However, when moisture resistant manganese dioxide produced using the process of this patent was employed in lithium/nonaqueous cells, such cells did not yield commercially useful efficiencies at temperatures of 21° C. and 35° C. Applicant believes that the reason for the poor performance at these temperatures of such thermally decomposed manganous nitrate is that the beta manganese dioxide produced possesses a highly crystalline form.

Other approaches for the production of electrochemically useful manganese dioxide from manganous salts have also been adopted. Among the more useful of these are processes such as that described in U.S. Pat. No. 4,048,027 which involves producing amorphous electrolytic manganese dioxide ("EMD") by the electrolysis of manganous nitrate hexahydrate. In general, EMD, which may be heat-treated to reduce its water content as is described in British Pat. No. 1,199,426 and U.S. Pat. No. 4,133,856, possesses desirable electrochemical properties for nonaqueous cell usage. However, even heat-treated EMD picks up water so rapidly upon exposure to ambient humidity that, even in a dry room having a relative humidity of from 1–3%, it is difficult to assemble lithium batteries employing EMD as the cathode material which will maintain capacity. As is well known in the art, moisture present in $MnO_2$ will react with lithium and/or the nonaqueous electrolyte in a manner which may result in a cell bulging from its initial height.

U.S. Pat. No. 4,476,104, which patent is herein incorporated by reference, discloses a novel form of manganese dioxide and a process for the production thereof. This novel manganese dioxide possesses a low surface area coupled with a high degree of amorphousness. More specifically, such manganese dioxide has a surface area of no greater than about 15 $m^2$/gm and an X-ray diffraction pattern indicating relative intensities, when compared with crystalline beta manganese dioxide (I.C. Sample No. 6), of no greater than about 30% at d value 3.12 Å, no greater than about 80% at d value 2.41 Å, no greater than about 65% at d value 1.63 Å and no greater than about 65% at d value 1.31 Å. It is believed that these properties are the reasons why this form of manganese dioxide possesses a high resistance to water pickup and a high degree of electrochemical activity. Crystalline beta manganese dioxide (I.C. No. 6) refers to I.C. Sample No. 6 described by A. Kozawa and R. A. Powers in Proceedings of the First Manganese Dioxide Symposium, pg. 4, Volume 1, Cleveland, 1975, published by the Electrochemical Society, Inc. This form of manganese dioxide will produce essentially the same X-ray diffraction pattern as that reported as ASTM Card No. 24–735.

However, although the manganese dioxide of this application possesses desirable properties, the process taught therein for producing such manganese dioxide is restricted to using manganese nitrate hexahydrate-containing starting material. Although manganous nitrate hexahydrate may be prepared from commercially available materials by means well known to one skilled in the art (see, for example, "Nitrate hydrates des metaux bivalens", D. Weigel, B. Imelik and M. Prettre, Bull. Soc. Chem. Fr. 836 (1964)), it would nevertheless be desirable to possess a process which could produce this form of manganese dioxide and/or manganese dioxide having properties similar to this form of manganese dioxide from a wide variety of starting materials. In addition, unless carefully monitored, the process taught in U.S. Pat. No. 4,476,104 tends to produce manganese dioxide having a very low surface area of about 1.2 square meters per gram or less. Cells employing this very low surface area manganese dioxide have exhibited poor pulse discharge performance characteristics at room temperature and below. It is believed that by slightly increasing the surface area of the manganese dioxide produced, i.e. to preferably about 7 square meters per gram (7 $m^2$/gm), pulse discharge performance could be improved to an acceptable level without materially adversely affecting the manganese dioxide's resistance to water pickup.

It is therefore an object of this invention to provide a process for the production of manganese dioxide having a relatively low surface area coupled with a high degree of amorphousness which process can employ a wide range of starting materials.

It is another object of this invention to provide a process for the production of manganese dioxide having a relatively low surface area coupled with a high degree of amorphousness which manganese dioxide exhibits desirable pulse discharge properties in nonaqueous cells at room temperature.

The foregoing and additional objects will become apparent from the following description and examples.

SUMMARY OF THE INVENTION

This invention relates to a process for the production of manganese dioxide comprising the steps of:

(a) mixing at least one manganous salt with at least one compound selected from the group consisting of ammonium permanganate and alkali metal permanganates to form a homogeneous mixture;

(b) heating the homogeneous mixture of step (a) to between about 120° C. and about 180° C., preferably to about 150° C., in an oxygen-containing atmosphere until at least 85% of the manganous salt is converted to manganese dioxide; and (c) heating the material produced in step (b) in an oxygen-containing atmosphere at between about 210° C. and about 300° C., preferably at about 250° C., until the surface area of the manganese dioxide is between about 3 m$^2$/gm and about 12 m$^2$/gm.

It is believed that the rate at which a particular form of manganese dioxide will pick up water is related to the surface area of such manganese dioxide. However, it is also believed that a certain minimum surface area is desirable in order to achieve desirable pulse discharge performance at room temperature (i.e. about 21° C.) and below. The preferred embodiments of the process of this invention involve a two step heating process that will produce a manganese dioxide having a surface area of between about 3 m$^2$/gm and about 12 m$^2$/gm, more preferably between about 5 m$^2$/gm and 10 m$^2$/gm and most preferably about 7 m$^2$/gm. Consequently, it is believed that manganese dioxide produced in accordance with the process of this invention will possess desirable resistance to water pickup thus making it suitable for use in cells that are subject to pulse discharge conditions.

In addition, it is theorized that manganese dioxide which possesses a less ordered form will exhibit superior electrochemical properties relative to manganese dioxide which possesses a highly crystalline structure. It is thus believed that because the manganese dioxide produced by the process of this invention possesses a relatively amorphous structure it is admirably suited for use in electrochemical cells.

As is employed herein, the term "manganous salt" refers to a compound containing manganese having a +2 valence state ($Mn^{2+}$). Illustrative of the manganous salts which may be employed in the process of this invention are manganous nitrate, manganous chloride, manganous sulfate, manganous carbonate, as well as mixtures thereof. However, care should be taken when manganous chloride is utilized since chlorine gas will be liberated during the manganese dioxide formation. The manganous salt starting material may be either hydrated or anhydrous. Because of its commercial availability and because of the desirability of the product produced therefrom, the preferred manganous salt starting material is a 50% aqueous solution of manganous nitrate.

Illustrative of the alkali metal permanganates which may be employed are potassium permanganate, lithium permanganate and sodium permanganate. Although ammonium permanganate may be employed, the use of this compound is discouraged due to its explosive properties.

The alkali metal permanganate and/or ammonium permanganate ($MnO_4^-$) may be added to the manganous salt ($Mn^{2+}$) starting material such that the molecular ratio $Mn^{2+}/MnO_4^-$ varies between 3 and 90, and preferably between 7 and 17.

The process of this invention can be typically performed as follows. The manganous salt starting material is brought into intimate contact with the alkali metal permanganate by any means well known to one skilled in the art such as grinding, rolling, blending and the like. (Because of the explosive nature of ammonium permanganate, this compound is not included in this description of a typical practice of the invention. However, if one desires to employ such a compound it could be used exactly as are the alkali metal permanganates.) A preferred method for achieving such intimate contact when manganous nitrate hexahydrate is employed as the starting material is to heat a mixture of the manganous nitrate hexahydrate and the alkali metal permanganate at a temperature sufficiently high to homogenize the mixture, i.e. of about 100° C. The mixture is then allowed to cool to form a solidified mass, which is ground to produce an intimately contacted manganous nitrate/alkali metal permanganate material. This homogenization should be accomplished in an oxygen-containing atmosphere.

The heating steps of the process of this invention are typically carried out in a closed reactor so that the humidity in the reactor may be controlled. The reactor should be equipped with an inlet so that oxygen or an oxygen-containing gas may be pumped in. The reactor should also possess a vent through which the gas liberated by the reaction may exit. An oil-filled trap may be employed in conjunction with such venting means in order to prevent the back diffusion of air or water vapor.

The intimately contacted manganous salt/alkali metal permanganate material is placed in the reactor and a continuous flow of dry or wet oxygen-containing gas is begun. As used herein, the term "dry oxygen-containing gas" refers to a gas which has not been bubbled through water prior to its entry into the reactor. Conversely, the term "wet oxygen-containing gas" refers to a gas which has been bubbled through water prior to its entry into the reactor. The reactor can then be slowly heated to between about 120° C. and about 180° C., preferably to about 150° C. Such heating procedure should take preferably from about 15 to about 30 minutes, although longer or shorter time periods may be employed.

Once the desired temperature has been reached, the system is maintained in such temperature range until at least 85% of the manganous salt is converted into manganese dioxide. This conversion is typically indicated by the formation of a black mass. Typically, the elevated temperature is maintained for a period of between about 1 and about 4 hours, preferably for about 2 hours. As will be recognized by one skilled in the art, this period will depend upon the temperature selected, reaction batch size, the composition of the starting material, as well as upon other factors. The oxygen-containing gas which is fed into the reactor during this constant temperature period may be wet or dry.

After the first heating procedure discussed above is complete, the reaction product is then further heated to between about 210° C. and about 300° C., preferably to about 250° C. This second heating procedure may take place in the presence of a wet or dry oxygen-containing atmosphere.

Once the desired temperature of this second heating step has been reached, the reaction is maintained at such temperature for a period of time sufficient to alter the characteristics of the manganese dioxide-containing material produced in the first heating step such that the manganese dioxide has a surface area of at least between about 3 m²/gm and about 12 m²/gm. Typically, this period of time is of a duration of between about 1 and about 4 hours, preferably for about 2 hours. Care should be taken to avoid maintaining this higher temperature for too long a period of time since the product may become too crystalline and thus exhibit less desirable electrochemical properties. The crystallinity of the manganese dioxide during this second heating step may be monitored by periodically subjecting a sample of the manganese dioxide produced to X-ray diffraction analysis. The product may then be allowed to cool to room temperature, such cooling preferably being done in a dry oxygen-containing atmosphere.

The raw manganese dioxide produced should preferably be washed with an acidic solution in order to remove any alkali metal ions. Most preferably, for many of the manganous salts of this invention, the acid used in such wash could correspond to the anion of the manganous salt employed. Thus hydrochloric acid is preferably employed when manganous chloride is used as the starting material; sulfuric acid is preferred when manganous sulfate is employed; and nitric acid is preferred when manganous nitrate is employed. When using manganous carbonate as the starting material, then hydrochloric, nitric or sulfuric acid may be utilized. This acid wash is preferably performed at an elevated temperature of between about 60° C. and about 70° C. The acid washed manganese dioxide may then be washed with water and subsequently dried by heating at a temperature of between about 120° C. and about 150° C.

The manganese dioxide produced in accordance with the process of this invention exhibits desirable electrochemical properties such that it can be used in cells that will exhibit desirable pulse discharge capabilities at room temperature. Moreover, the embodiments of this invention will produce manganese dioxide having a surface area of 12 m²/gm or less. Thus this manganese dioxide will be able to be handled in a dry room (having a relative humidity of between about 1% and about 3%) rather than having to be handled in a dry box (having a water content of between about 50 ppm and about 100 ppm) prior to its insertion into nonaqueous cells having lithium anodes.

EXAMPLES

The following Examples are intended to further illustrate the invention and are not intended to limit the scope of the invention in any manner.

EXAMPLE 1

A quantity of intimately associated manganous nitrate hexahydrate and potassium permanganate was prepared as follows. 19.24 grams of $Mn(NO_3)_2.6H_2O$ and 3 grams of $KMnO_4$ (molecular ratio of $Mn^{2+}/MnO_4^-$ of 3.53) were placed in a 500 ml conical flask equipped with a two hole rubber stopper. The flask was connected to an oxygen tank through one of the holes, while the other provided a gas outlet. The mixture was heated at 100° C. There was little dissolution of the $KMnO_4$ in the molten manganous nitrate hexahydrate, so the solidified mass was cooled and removed from the flask and ground.

This ground mixed material was placed into the same flask assembly described above. The flask was placed in a furnace and the temperature was raised from room temperature to 150° C. over a 20 minute period. During this period of time dry oxygen was fed into the flask directly from the tank at the rate of about 1 cubic ft/hour.

When the temperature reached 150° C., the system was maintained at this temperature for a period of about two hours. The temperature was then raised to about 250° C. over a half-hour period. Throughout this entire period (i.e. the 2-hour hold at 150° C. and the subsequent raising of the temperature to 250° C.) dry oxygen continued to flow into the flask directly from the tank at the rate of about 1 cubic ft/hour.

The temperature of the flask was maintained at 250° C. for two hours and was then allowed to cool to room temperature. Dry oxygen was continually fed into the reactor during this period.

The resultant raw manganese dioxide was washed at 70° C. in a 10 percent aqueous nitric acid solution, filtered and washed several times with water. The final product was dried by heating for 16 hours at a temperature of between about 125° C. and about 150° C.

Elemental analysis revealed that such product was 98.63 weight percent manganese dioxide based upon the total weight of the product, said manganese dioxide having the formula $MnO_{2.00}$. In the formula $MnO_x$, "x" is defined as $1+(\%\ peroxidation/100)$, said "peroxidation" being defined as the total manganese content in tetravalent form. The surface area of such product was determined to be 10.7 m²/gm as measured by the BET method. This method is described in detail by S. Brunauer, P. Emmet and E. Teller in J. Am. Chem. Soc., Vol. 60, pp. 309–316, (1938).

EXAMPLE 2

Using the apparatus and process employed in Example 1, several grams of manganese dioxide were produced utilizing manganous nitrate hexahydrate and potassium permanganate having a molecular ratio of $Mn^{2+}/MnO_4^-$ of 7.94. The resulting product was determined to be 94.92 weight percent manganese dioxide based on the total weight of the product, said manganese dioxide having the formula $MnO_{1.99}$. The surface area of the product was determined to be 6.70 square meters per gram.

EXAMPLE 3

Using the apparatus employed in Example 1, manganese dioxide was produced using 136.3 grams of $Mn(NO_3)_2.6H_2O$ and 15 grams of $KMnO_4$ (molecular ratio of $Mn^{2+}/MnO_4^-$ of 5.02). The mixture was heated for 2 hours at 150° C. The resulting product from this single heating step process was determined to be 98.25 weight percent manganese dioxide based on the total weight of the product, said manganese dioxide having the formula $MnO_{2.00}$. The surface area of the product was determined to be 14.03 square meters per gram.

Using an identical amount of $Mn(NO_3)_2.6H_2O$ and $KMnO_4$ as above, a mixture was produced which was heated at 150° C. for 2 hours. This product was then heated at 250° C. for 2 hours following the process of this invention and the product produced was determined to contain 99.33 weight percent manganese dioxide based on the total weight of the product, said manganese dioxide having the formula $MnO_{1.99}$. The surface area of the product was determined to be 6.6 square meters per gram. This example demonstrated that the second heating step can reduce the surface area of the manganese dioxide to a level suitable for battery application.

EXAMPLE 4

Using the apparatus and process employed in Example 1, several grams of manganese dioxide were produced utilizing manganous nitrate hexahydrate and lithium permanganate trihydrate having a molecular ratio of $Mn^{2+}/MnO_4^-$ of 7.94. The product was determined to contain 88.85 weight percent manganese dioxide based on the total weight of the product, said manganese dioxide having the formula $MnO_{1.99}$. The surface area was determined to be 3.15 square meters per gram.

EXAMPLE 5

Using the apparatus and process employed in Example 1, several grams of manganese dioxide were produced utilizing manganous nitrate hexahydrate and lithium permanganate trihydrate having a molecular ratio of $Mn^{2+}/MnO_4^-$ of 16.8. The product was determined to contain 93.36 weight percent manganese dioxide based on the total weight of the product, said manganese dioxide having the formula $MnO_{1.99}$. The surface area was determined to be 7.7 square meters per gram.

EXAMPLE 6

8.25 gm $KMnO_4$ and 150 ml of 50% $Mn(NO_3)_2$ (molecular ratio of $Mn^{2+}/MnO_4^-$ of dish until oxidation occurred at about 130° C. The temperature was then raised to 150° C. for 2 hours, followed by 250° C. for 2 hours in air. $MnO_2$ was obtained containing 3.06% potassium, which was then treated with 10% nitric acid solution, washed with distilled water and dried overnight at 100° C. Analysis showed that the product comprised 97.38% manganese dioxide based on the total weight of the product, said manganese dioxide having the formula $MnO_{1.98}$. The surface area was 5.1 square meters per gram.

EXAMPLE 7

The material of Example 1 was run in a flooded cell with a nonaqueous electrolyte comprised of about 40 volume percent 1,3-dioxolane, about 30 volume percent 1,2-dimethoxyethane, about 30 volume percent 3-methyl-2-oxazolidone plus about 0.2 percent dimethylisoxazole and containing 1 mole per liter of the solute of $LiCF_3SO_3$. The contents of the cell comprised 40 milligrams of lithium as the anode; about 1.5 ml of the above-described electrolyte; a nonwoven polypropylene separator which adsorbed some of the electrolyte and 0.35 gm of a cathode mix which consisted of 86.2 weight percent $MnO_2$ (produced as described in Example 1), 8.5 weight percent graphite, 2.1 weight percent acetylene black and 3.2 weight percent polytetrafluoro-ethylene binder.

Tests were run at 21° C. and 35° C. until a 2-volt cutoff was reached. A load resistor of 30,000 ohms (0.1 $mA/cm^2$ cathode current density) was used for continuous discharge and a superimposed load of 250 ohms for 2 seconds once every three days was used for the pulse discharge. The $MnO_2$ delivered 83.7% efficiency (based on a one electron reduction) to a 2-volt cutoff at 21° C. and 94.0% at 35° C.

What is claimed is:

1. A process for the production of manganese dioxide comprising the steps of:
   (a) mixing at least one manganous salt ($Mn^{2+}$) with at least one compound ($MnO_4^-$) selected from the group consisting of alkali metal permangantes and ammonium permanganate to produce a homogeneous solid mixture;
   (b) heating the homogeneous mixture of step (a) to between about 120° C. and about 180° C. in an oxygen-containing atmosphere until at least 85% of the manganous salt is converted into manganese dioxide; and
   (c) heating the product produced in step (b) in an oxygen-containing atmosphere at between about 210° C. and about 300° C. until the surface area of the manganese dioxide is between about 3 square meters per gram and about 12 square meters per gram.

2. The process of claim 1 wherein, in step (a) the manganous salt and the compound are mixed in a molecular ratio of $Mn^{2+}/MnO_4^-$ of between about 3 and 90.

3. The process of claim 2 wherein the molecular ratio of $Mn^{2+}/MnO_4^-$ is between about 7 and 17.

4. The process claim 1, 2 or 3 wherein in step (c) the surface area of the manganese dioxide is between about 5 and about 10 square meters per gram.

5. The process of claim 1, 2 or 3 wherein the temperature in step (b) is maintained for a period of time between about 1 and about 4 hours.

6. The process of claim 5 wherein the temperature in step (c) is maintained for a period of time between about 1 hour and about 4 hours.

7. The process of claim 5 wherein the temperature in step (b) is about 150° C., and such temperature is maintained for a period of time of about 2 hours.

8. The process of claim 7 wherein the temperature is elevated in step (c) to 250° C. and maintained at this temperature for about 2 hours.

9. The process of claim 1, 2, or 3 wherein the manganous salt is selected from the group consisting of manganous nitrate, manganous chloride, manganous sulfate, manganous carbonate and mixtures thereof.

10. The process of claim 9 wherein the alkali metal permanganate is selected from the group consisting of sodium permanganate, lithium permanganate, potassium permanganate and mixtures thereof.

11. The process of claim 1 wherein the manganous salt is manganous nitrate hexahydrate and the compound is potassium permanganate.

* * * * *